(12) United States Patent
Merrill et al.

(10) Patent No.: US 11,934,960 B2
(45) Date of Patent: *Mar. 19, 2024

(54) DISPARITY MITIGATION IN MACHINE LEARNING-BASED PREDICTIONS FOR DISTINCT CLASSES OF DATA USING DERIVED INDISCERNIBILITY CONSTRAINTS DURING NEURAL NETWORK TRAINING

(71) Applicant: Fairness-as-a-Service, Inc., Marina Del Rey, CA (US)

(72) Inventors: John Wickens-Lamb Merrill, Seattle, WA (US); Kareem Saleh, Marina Del Rey, CA (US); Mark Eberstein, Marina del Rey, CA (US)

(73) Assignee: Fairness-as-a-Service, Marina Del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,737

(22) Filed: May 1, 2023

(65) Prior Publication Data
US 2023/0267334 A1    Aug. 24, 2023

Related U.S. Application Data (63) Continuation of application No. 18/075,297, filed on Dec. 5, 2022, now Pat. No. 11,676,037.
(Continued)

(51) Int. Cl.
*G06N 3/08*    (2023.01)
*G06N 3/088*    (2023.01)

(52) U.S. Cl.
CPC .................................. *G06N 3/088* (2013.01)

(58) Field of Classification Search
None
See application file for complete search history.

(56) References Cited

U.S. PATENT DOCUMENTS

2011/0044534 A1    2/2011    Dewan et al.
2021/0374581 A1    12/2021    Wei et al.

OTHER PUBLICATIONS

Duan et al., "Astraea: Self-Balancing Federated Learning for Improving Classification Accuracy of Mobile Deep earning Applications", 2019.

(Continued)

*Primary Examiner* — Lut Wong
(74) *Attorney, Agent, or Firm* — Padowithz Alce; Alce PLLC (57) ABSTRACT

A system and method includes generating approximate distributions for distinct classes of data samples; computing a first partial Jensen-Shannon (JS) divergence and a second partial JS divergence based on the approximate distribution of the disparity affected class of data samples with reference to the approximate distribution of the control class of data samples; computing a disparity divergence based on the first partial JS divergence and the second partial JS divergence; generating a distribution-matching term based on the disparity divergence, wherein the distribution-matching term mitigates an inferential disparity between the control class of data samples and the disparity affected class of data samples during a training of an unconstrained artificial neural network; constructing a disparity-constrained loss function based on augmenting a target loss function with the distribution-matching term; and transforming the unconstrained ANN to a disparity-constrained ANN based on a training of the unconstrained ANN using the disparity-constrained loss function.

18 Claims, 6 Drawing Sheets

Related U.S. Application Data (60) Provisional application No. 63/301,811, filed on Jan. 21, 2022, provisional application No. 63/285,994, filed on Dec. 3, 2021.

(56) References Cited

OTHER PUBLICATIONS

Yu et al., "Inclusive GAN: Improving Data and Minority Coverage in Generative Models," 2020.

Sourcing a Corpus of Data Samples S210

Approximating Data Sample Distributions S220

Computing a Disparity Metric Value S230

Computing an Indiscernibility Constraint S240

Training a Machine Learning Model with an Indiscernibility Constraint S250

DISPARITY MITIGATION IN MACHINE LEARNING-BASED PREDICTIONS FOR DISTINCT CLASSES OF DATA USING DERIVED INDISCERNIBILITY CONSTRAINTS DURING NEURAL NETWORK TRAINING

CROSS-REFERENCE TO RELATED APPLICATIONS

This application is a continuation of U.S. Pat. No. 11,676,037, filed on 5 Dec. 2022, which claims the benefit of U.S. Provisional Application Nos. 63/285,994, filed on 3 Dec. 2021, and 63/301,811. filed on 21 Jan. 2022, which are incorporated herein their entireties by this reference.

TECHNICAL FIELD

This invention relates generally to the machine learning training and machine learning optimization fields, and more specifically to a new and useful system and method in the machine learning training and machine learning optimization fields.

BACKGROUND

Various automated or semi-automated decisioning systems and the like may include machine learning algorithms that produce predictions that can inform or otherwise provide a substantial basis for one or more decisions output from these systems. Depending on the use case of an automated decisioning system, the machine learning algorithms may operate on input data from multiple distinct classes or categories of data. At least one technical problem that often persists in automated or semi-automated decisioning systems that use machine learning algorithms is that the algorithms may introduce or perpetuate undesired and/or unlawful disparity between the multiple classes or categories of data. That is, the machine learning algorithms as used in these decisioning systems may compute predictions that may be considered unfair towards one or more classes or data when compared to machine learning predictions computed for a control or dominant class of data.

The disparity of the predictions of the machine learning algorithms within automated decisioning systems can produce high disparity outcomes that adversely affect datasets in a minority or a non-dominant class or category.

In the present application, one or more implementations provide methods and systems for mitigating or minimizing disparity in predictions of these machine learning algorithms, per se, to improve the fairness of automated or semi-automated decisioning systems. One or more of the proposed technical solutions or techniques of the present application include a system and a method that enables simultaneous prediction distribution matching with several indiscernibility constraints that optimizes a learning of a target machine learning model towards indiscrimination between two or more classes of data underlying the prediction distributions.

Thus, there is a need in the machine learning field to create improved new and useful systems and methods for optimizing a training of a machine learning model for multiple criteria including indiscernibility between distinct classes of data and the like.

The embodiments of the present application described herein provide technical solutions that address, at least, the need described above.

BRIEF SUMMARY OF THE INVENTION(S)

In one embodiment, a computer-implemented method for mitigating disparities of inferential outputs of a machine learning model includes sourcing a corpus of data samples comprising at least (a) a non-disparity affected sub-corpus of a non-disparity affected class of data samples and (b) a disparity-affected sub-corpus of a disparity affected class of data samples; generating approximate distributions based on a computational assessment of the corpus of data samples, wherein the approximate distributions include an approximate distribution of the non-disparity affected class of data samples and an approximate distribution of the disparity-affected class of data samples; computing a first partial Jensen-Shannon (JS) divergence based on the approximate distribution of the non-disparity affected class of data samples with reference to the approximate distribution of the disparity affected class of data samples; computing a second partial JS divergence based on the approximate distribution of the disparity affected class of data samples with reference to the approximate distribution of the non-disparity affected class of data samples; computing a JS divergence based on the first partial JS divergence and the second partial JS divergence; generating an indiscernibility constraint based on the JS divergence, wherein the indiscernibility constraint mitigates a machine learning-based inferential disparity between the non-disparity affected class of data samples and the disparity affected class of data samples during a training of a target machine learning model; generating a disparity-mitigating loss function based on augmenting a target gradient descent algorithm with the indiscernibility constraint; and training the target machine learning model using a training corpus of labeled data samples, wherein the training includes performing backpropagation using the disparity-mitigating loss function.

In one embodiment, the disparity-mitigating loss function is defined as follows:

$$l(\mathcal{A}, \mathcal{B}, X, Y) = \lambda \underbrace{\sum_i \xi(a_i, b_i)}_{\text{Reduce error}} + \underbrace{(1-\lambda)JS(X, Y, m)}_{\text{reduce disparity}}$$

where $(A, B) = \xi(a_i, b_i) \in \langle R^N, R \rangle$ comprises a sequence of data samples and target values corresponding to the sequence of data samples, where $\xi$ relates to a target loss function, where $X, Y \subset A$ indicates that a first set of data samples X and a second set of data samples Y are subsets of a corpus of data samples A, where $\lambda \in [0, 1]$, where m>0.

In one embodiment, computing the first partial JS divergence includes: randomly sampling the approximate distribution of the non-disparity affected class of data samples; and defining an abbreviated non-disparity affected class of data samples based on the random sampling of the approximate distribution of the non-disparity affected class of data samples; computing the second partial JS divergence includes: randomly sampling the approximate distribution of the disparity affected class of data samples; and defining an abbreviated disparity-affected class of data samples based on the random sampling of the approximate distribution of the disparity-affected class of data samples.

In one embodiment, computing the first partial JS divergence includes computing a first Kullback-Leibler (KL) divergence based on a probability distribution of the abbreviated non-disparity affected class of data samples; and computing the second partial JS divergence includes computing a second KL divergence based on a probability distribution of the abbreviated disparity-affected class of data samples.

In one embodiment, generating the approximate distribution includes implementing standard kernel-based distribution estimates to the approximate distribution of the non-disparity affected class of data samples and the approximate distribution of the disparity-affected class of data samples.

In one embodiment, the JS divergence relates a distance between the approximate distribution of the non-disparity affected class of data samples and the approximate distribution of the disparity affected class of data samples that indicates a likely disparity between machine learning inferences associated with member samples of the disparity affected class and the non-disparity affected class.

In one embodiment, the method includes computing a distinct indiscernibility constraint for each of a plurality of distinct pairwise of a given non-disparity affected class of data samples and a given disparity-affected class of data samples.

In one embodiment, sourcing the corpus of data samples includes sourcing data samples from within a defined geographical region, wherein the corpus of data samples comprises a geographic region-specific corpus of data samples, and computing the indiscernibility constraint is based on the geographic region-specific corpus of data samples.

In one embodiment, the indiscernibility constraint, when applied in the training of the target machine learning model, causes a distribution of a first set of machine learning inferences based on a first class of data to substantially align with a distribution of a second set of machine learning inferences based on a second class of data.

In one embodiment, the method includes computing an updated JS divergence distance based on machine learning inferences of the target machine learning, as trained; and terminating the training of the target machine learning model when the updated JS divergence satisfies a non-disparity threshold.

In one embodiment, the disparity-mitigating loss function, when applied during the backpropagation function of the training of the target machine learning model, computes coefficients for learnable variables of the target machine learning model that simultaneously minimizes an accuracy error of the target machine learning model while minimizing a disparity distance between distinct distributions of inferential outputs of the target machine learning model.

In one embodiment, the machine learning model comprises a supervised artificial neural network.

In one embodiment, a method of encouraging inferential fairness of an artificial neural network includes generating estimated distributions of a non-disparity affected class of data samples and a disparity-affected class of data samples based on an assessment of a corpus of data samples; computing a first Kullback-Leibler (KL) divergence based on the approximate distribution of the non-disparity affected class of data samples with reference to the approximate distribution of the disparity affected class of data samples; computing a second KL divergence based on the approximate distribution of the disparity affected class of data samples with reference to the approximate distribution of the non-disparity affected class of data samples; computing a disparity divergence based on the first KL divergence and the second KL divergence; generating a distribution-matching term based on the disparity divergence, wherein the distribution-matching term mitigates an inferential disparity between the non-disparity affected class of data samples and the disparity affected class of data samples during a training of a target artificial neural network; constructing a disparity-constrained loss function based on augmenting a target loss function with the distribution-matching term; and training the target artificial neural network using a training corpus of labeled data samples, wherein the training includes performing backpropagation using the disparity-constrained loss function.

In one embodiment, the method includes generating a distinct distribution-matching term for each of a plurality of distinct disparity-affected classes of data samples of the corpus of data samples; and constructing a multi-class disparity-constrained loss function based on incorporating the distinct distribution-matching term for each of the plurality of disparity-affected classes of data samples into the target loss function.

In one embodiment, the distribution-matching term, when applied in the training of the target machine learning model, causes a distribution of a first set of artificial neural network inferences based on a first class of data to substantially match a distribution of a second set of artificial neural network inferences based on a second class of data.

In one embodiment, a method includes generating estimated distributions of a control class of data samples and a disparity-affected class of data samples based on an assessment of a corpus of data samples; computing a first partial Jensen-Shannon (JS) divergence based on the approximate distribution of the control class of data samples with reference to the approximate distribution of the disparity affected class of data samples; computing a second partial JS divergence based on the approximate distribution of the disparity affected class of data samples with reference to the approximate distribution of the control class of data samples; computing a disparity divergence based on the first partial JS divergence and the second partial JS divergence; generating a distribution-matching term based on the disparity divergence, wherein the distribution-matching term mitigates an inferential disparity between the control class of data samples and the disparity affected class of data samples during a training of an unconstrained artificial neural network; constructing a disparity-constrained loss function based on augmenting a target loss function with the distribution-matching term; and transforming the unconstrained artificial neural network to a disparity-constrained artificial neural network based on a training of the unconstrained artificial neural network using the disparity-constrained loss function.

In one embodiment, generating the disparity divergence includes summing the first partial JS divergence with the second partial JS divergence to a summed disparity divergence value and dividing the summed disparity divergence value by two.

In one embodiment, the distribution-matching term, when applied in the training of the target artificial neural network causes a distribution of a first set of artificial neural network inferences based on a first class of data to substantially match a distribution of a second set of artificial neural network inferences based on a second class of data.

DESCRIPTION OF THE PREFERRED EMBODIMENTS

The following description of the preferred embodiments of the invention is not intended to limit the inventions to these preferred embodiments, but rather to enable any person skilled in the art to make and use these inventions.

1. System for Model Disparity Mitigation and Training

Figure 1:
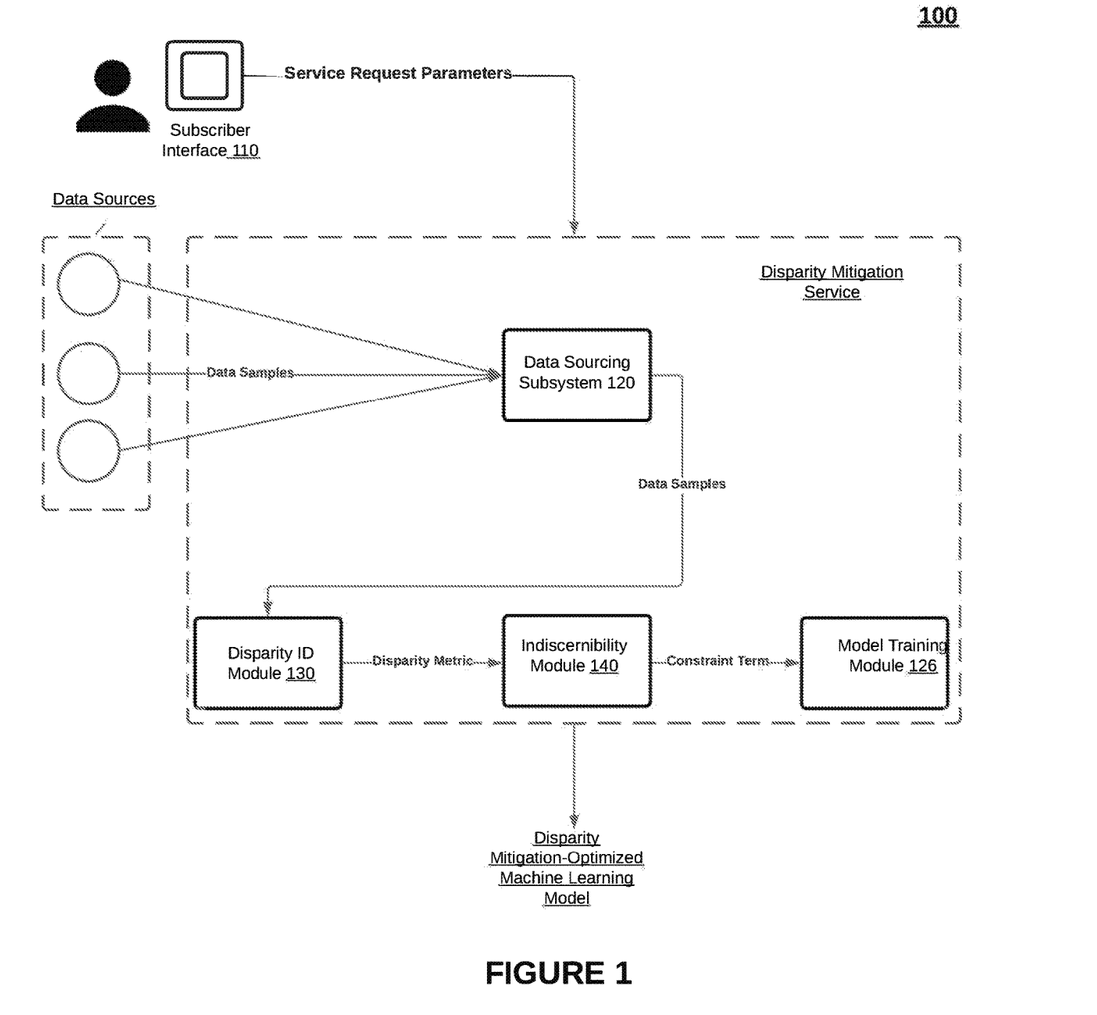
FIG. 1 illustrates a schematic representation of a system 100 in accordance with one or more embodiments of the present application.

As shown by reference to FIG. 1, a disparity mitigation system 100 for model disparity mitigation and training includes a subscriber interface no, a data sourcing system 120, a disparity ID module 130, an indiscernibility constraint generation module 140, and a model training module 150.

The disparity mitigation system 100 may preferably be implemented over a distributed network of computers that control the implementation of various disparity mitigation modules (software implemented using processing circuits and/or hardware) or computing components within the system 100 and the like. In one or more embodiments, the disparity mitigation system 100 may be implemented by a disparity mitigation service that may operate to provide model disparity mitigation services for remote subscribers to the service. Additionally, or alternatively, the disparity mitigation service may be implemented to mitigate disparity in predictions between distinct classes for any suitable type or kind of machine learning algorithm or model, including but not limited to, any supervised, semi-supervised, and/or unsupervised artificial neural network.

The subscriber interface 110 may be provided as a client interface that may be in operable communication with one or more systems, modules, and/or components of the system 100. In one or more embodiments, the subscriber interface no may include a graphical user interface that enables a subscriber or user to interface with a service implementing the system 100. Using the subscriber interface no, a user may provide one or more disparity mitigation parameters for optimizing a target machine learning model for disparity reduction, one or more corpora of data samples, one or more corpora of training and/or test data samples, a selection of hyperparameters and/or disparity-constraint parameters, and/or the like.

The data sourcing system 120 preferably functions to source data required for computing an indiscernibility constraint (as described below) and may be in operable communication with one or more sources of historical data samples and/or one or more corpora of training data samples for training a target machine learning model. The data sourcing system 120 may function to store any sourced corpora of data and make the stored corpora of data accessible to any system, component, and/or module of the system 100 including, but not limited to, the disparity ID module 130 and the model training module 150.

The disparity identification (ID) module 130 preferably functions to compute and/or identify disparity in predictions of a target machine learning model. In one or more embodiments, the disparity ID module 130 may function to generate distributions underlying data samples using one or more distribution generation techniques, such as kernel-density estimation or the like. Additionally, or alternatively the disparity ID module 130 may function to compute a disparity metric value, such as a Jensen-Shannon divergence, between at least two distributions. The disparity ID module 130 may preferably be in operable communication with at least the data sourcing system 120 and the indiscernibility constraint generation module 140.

The indiscernibility constraint generation module 140 preferably functions to generate an indiscernibility constraint term for a loss function of a target machine learning model. In one or more embodiments, the indiscernibility module 140 may be in operable communication with the disparity ID module 130 for obtaining one or more disparity metric values that may inform a computation of an indiscernibility constraint term.

Additionally, or alternatively, in one or more embodiments, the disparity mitigation system 100 may include a loss function generating module that may be integrated with the indiscernibility constraint generation module 140. In such embodiments, the loss function generating module may operate to create or generate a loss function that includes an indiscernibility constraint term for optimizing a target machine learning model.

The model training module 150 preferably functions to perform training operations for a target machine learning model having a disparity-constrained error function.

It should be recognized that, in some embodiments, one or more of the modules of the disparity mitigation system 100 may be combined and/or integrated with other modules. In a non-limiting example, the disparity ID module 130 may be combined with and/or fully integrated with the indiscernibility constraint generation module 140 as a single module that performs the entirety of the functions of both modules. Similarly, any of the modules described herein may be partitioned into distinct or sub-modules.

2. Method for Model Disparity Mitigation and Model Training

Figure 2:
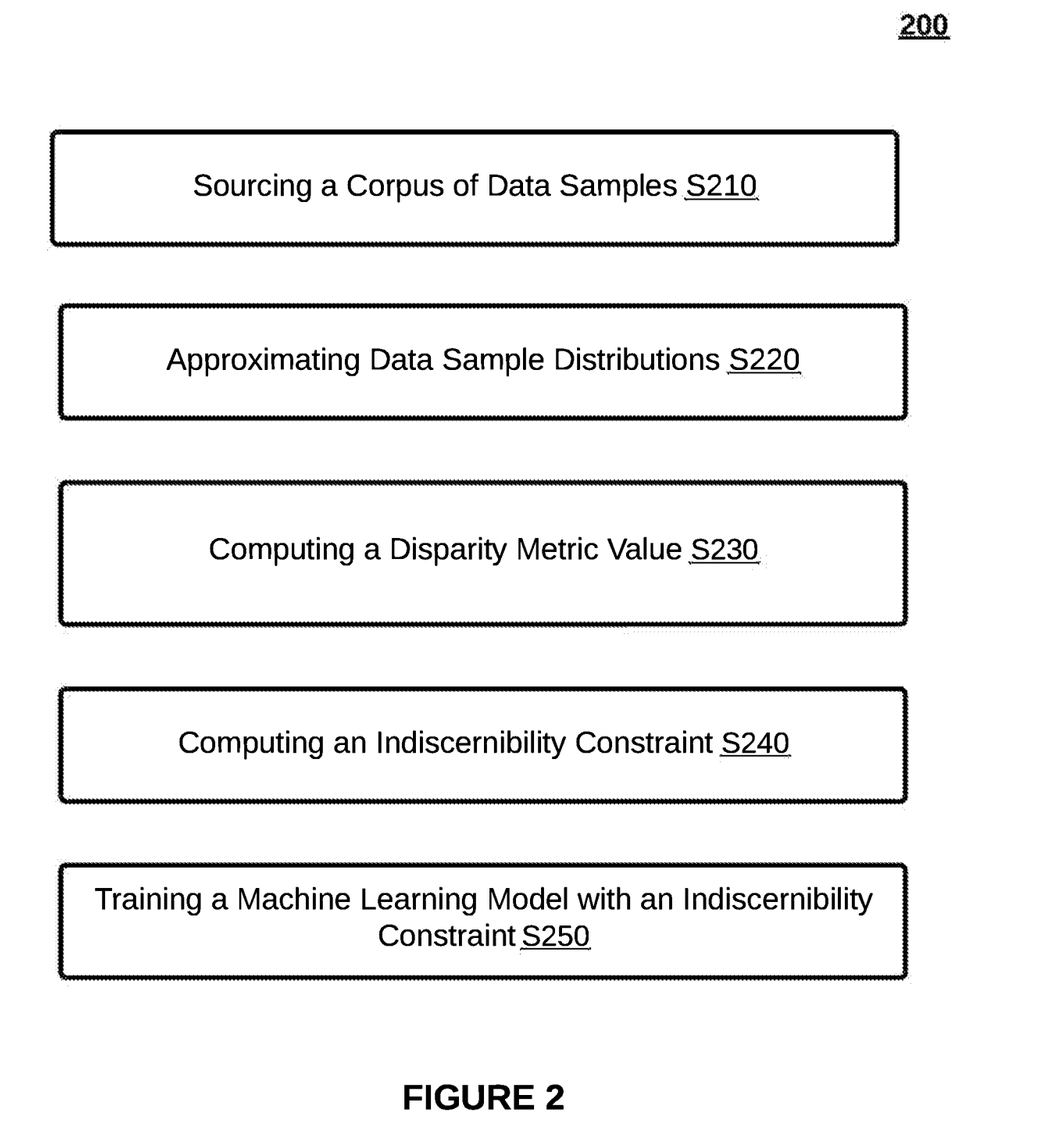
FIG. 2 illustrates an example method 200 in accordance with one or more embodiments of the present application.

As shown by reference to FIG. 2, the method 200 for mitigating disparity in machine learning predictions includes sourcing one or more corpora of data samples S210, approximating distributions of distinct classes of data samples S220, computing a divergence between distinct distributions S230, defining an indiscernibility constraint as a part of a loss function parameter for training a model S240, and implementing a disparity mitigation constraint during model training S250.

2.10 Sourcing Corpora of Historical Records

S210, which includes sourcing one or more corpora of data samples, may function to collect, aggregate, and/or obtain data samples from any suitable source. In one or more embodiments, the one or more corpora of data samples may include collections of historical records, values, and the like that may have been used in producing a decision in an automated decisioning system or the like. Additionally, or alternatively, the one or more corpora of data samples may include historical decisions and machine learning-based predictions produced on the basis of at least a subset of the historical records.

In one or more embodiments, S210 may function to source the one or more corpora of data samples programmatically, via an application programming interface or the like. Additionally, or alternatively, S210 may function to source the one or more corpora of data samples via accessing one or more databases of records or collecting data samples from one or more subscribers to a service or the like implementing the method 200. In such embodiments, the method 200 may include providing a web-based user interface that enables a subscriber to interface and/or communicate with a machine learning disparity mitigation service (e.g., system 100 or fairness service) for providing the corpora of data samples to mitigate disparity in the machine learning models involved in one or more automated or semi-automated decisioning systems.

In a first implementation, sourcing one or more corpora of data samples may include sourcing data samples from an identified geographic region. In some embodiments, data samples may have varying attributes including, but not limited to, varying distribution characteristics and/or attributes. Accordingly, in one or more embodiments, a target application and/or target machine learning model implemented in a specific geographic region may benefit from data samples sourced within a geographic region in which the application or model may be applied for predictions and/or decision for class members within the identified region.

Data Sample Handling and Data Sample Analysis

In one or more embodiments, S210 may function to identify a plurality of distinct classes or categories of data within the one or more corpora of data samples. For instance, S210 may function to identify or define a first class of data as a control class and a second class of data as a test class or the like. In such embodiments, the plurality of distinct classes of data may be identified on the basis of any distinguishing feature(s) of an associated dataset. For instance, if the one or more corpora of data samples include a plurality of distinct vehicles, S210 may function to classify or categorize the data on the basis of whether the data is associated with a sedan or a truck and thus, the distinguishing feature, in this example, for classifying distinct data groups may be the vehicle type. In yet another example, if the one or more corpora of data samples include a plurality of images of human beings, S210 may function to classify or categorize the data on the basis of whether the image is associated with a male or a female (e.g., demographic-informed distinguishing feature).

Additionally, or alternatively, S210 may function to partition the one or more corpora of data samples into at least a first corpus of data samples and a second corpus of data samples. It shall be recognized that S210 may function to partition the corpora into any suitable number of individual corpuses beyond a first and a second corpus. In one or more embodiments, the partitioning of the one or more corpora of data samples may preferably be based on one or more distinct classifications associated with varying subsets of data samples within the one or more corpora. For example, S210 may function to define the first corpus of data samples based on extracting data samples from the corpora of data samples having a first classification. In such an example, S210 may function to define the second corpus of data samples based on extracting data samples from the corpora of data samples having the second classification.

Data Analysis and Feature Derivation(s)

Additionally, or alternatively, S210 may function to compute one or more corpus metrics for each distinct corpus or subset of data samples of the one or more corpora of data samples. S210, in one or more embodiments, may function to perform any suitable analytical or statistical technique or method to produce the one or more derived features for each distinct corpus of data samples. In one example, S210 may function to perform a time series analysis of each distinct corpus of data samples that may illustrate a change in the underlying data samples over time. In another example, S210 may function to perform vision processing or the like when the data samples of each distinct corpus include image data samples and the like. In some embodiments, S210 may function to implement a specialized feature extractor to identify features of the data samples required for generating the one or more derived features.

2.20 Defining Probability Distributions for Distinct Classes of Data

S220, which includes approximating distributions of distinct classes of data samples, may function to compute an approximate probability distribution of each of at least a first corpus of data samples and a second corpus of data samples. Preferably, the first corpus of data samples may define a control group (i.e., control class) and the second corpus of data samples may define a test group (i.e., test class).

(KDE) Probability Distribution Approximation

In one or more embodiments, approximating the distribution for the control class of data samples and for the test class of data samples may include computing an estimate of the distributions underlying each of the control and test groups of data samples using standard kernel-based distribution estimates (KDE). In such embodiments, implementing the KDE includes a non-parametric technique for estimating a probability density function of the variable data samples in each of the control class and the test class of data samples. At least one technical advantage of implementing the KDE for approximating the probability distribution of each distinct class of data samples includes an ability to enable a constant time computation of divergence between samples of the distinct probability distributions, which reduces the computational load for calculating divergence between the two distributions.

Additionally, or alternatively, S220 may function to define an abbreviated control class of data samples and an abbreviated test class of data samples based on randomly sampling each of the imputed probability distributions of the control class of data samples and the imputed probability distribution of the test class of data samples. In one implementation, the random sampling may include a stratified random sampling of each of the imputed probability distributions of the control and test groups of data samples. In such implementation, the probability distributions may be partitioned into equal or unequal parts and each partition may be randomly sampled for defining the abbreviated control and test groups of data samples.

It shall be recognized that while KDE may be used to approximate the probabilistic densities of the control class data samples and the test class data samples, any suitable or known distribution approximation technique, such as a generalized location model or other parametric approximation of a distribution, may be used in the method(s) described herein.

2.30 Computing Divergence | Computing Model Disparity

S230, which includes computing a divergence between distinct distributions, may function to identify a divergence distance between an abbreviated control class of data samples and an abbreviated test class of data samples. In one or more embodiments, the calculated divergence distance may indicate a disparity between machine learning predictions that may underlie the relative distributions of the control class of data samples and the test class of data samples. Accordingly, in such embodiments, the computed divergence distance may function as a proxy for a machine learning model disparity metric.

In one or more embodiments, computing the divergence distance between the abbreviated control class of control data samples and an abbreviated test class of test data samples includes computing an approximation of a Jensen-Shannon (JS) divergence between the approximations of the densities of the control class of control data samples and the test class of test data samples. In such embodiments, a JS divergence measures a difference between two distributions for which the value will be zero (0) when the distributions are mathematically equivalent and will be greater than zero or a non-zero value when the distributions are not mathematically equivalent.

In a first implementation, computing a divergence metric and/or model disparity metric for target distributions may include calculating an optimized or modified Jensen-Shannon distance between the target distributions. In this first implementation, in lieu of computing a traditional JS distance between distributions from which samples are drawn including each of the control class and the test class of data samples, S230 may function to compute the JS distance between the abbreviated control class of control data samples and the abbreviated test class of test data samples, which were randomly sampled from their respective distributions. In this way, each of the abbreviated control class of control data samples and the abbreviated test class of test data samples may operate as proxies for their underlying distributions and correspondingly, simplify a computation load of one or more computing entities or devices in calculating a JS distance between the volume of points in the underlying distributions.

In this first implementation, computing Kullback-Leibler (KL) divergences based on probabilities informed by each of the abbreviated control class of control data samples and the abbreviated test class of test data samples. The KL divergence may relate to a measure of how a first probability distribution may be different from a second probability distribution. However, in various embodiments described herein, the method 200 may implement the KL divergence in a different manner to compute a difference value between sets of random samples extracted from distinct distributions.

Additionally, since the KL divergence may be an asymmetric measure of divergence between distributions, in one or more embodiments when computing the JS divergence, S230 preferably functions to compute a first KL divergence based on the abbreviated control class of (random) control data samples and a second KL divergence based on the abbreviated test class of (random) test data samples. Accordingly, in computing the first KL divergence, S230 may function to compute the probabilities of the abbreviated control class of control data samples and the probabilities of the abbreviated test class of test data samples from the abbreviated control class of control data samples. A value of the first KL divergence may then be calculated based on the average between the computed probabilities. Similarly, in computing the second KL divergence, S230 may function to compute the probabilities of the abbreviated test class of test data samples and the probabilities of the abbreviated control class of control data samples from the abbreviated test class of test data samples. Likewise, a value of the second KL divergence may then be calculated based on the average between the computed probabilities.

Consequently, in a preferred embodiment, S230 may function to compute the JS divergence distance based on the first KL divergence distance and the second KL divergence distance. In this preferred embodiment, the first KL divergence may define a first JS-half and the second KL divergence may define a second JS-half. In the preferred embodiment, computing the JS divergence distance includes summing the first JS-half and the second JS-half and calculating an average total JS divergence distance by dividing the sum by two (2). In such embodiments, the average total JS divergence distance may function as a proxy or an estimation of machine learning model disparity.

Figure 3:
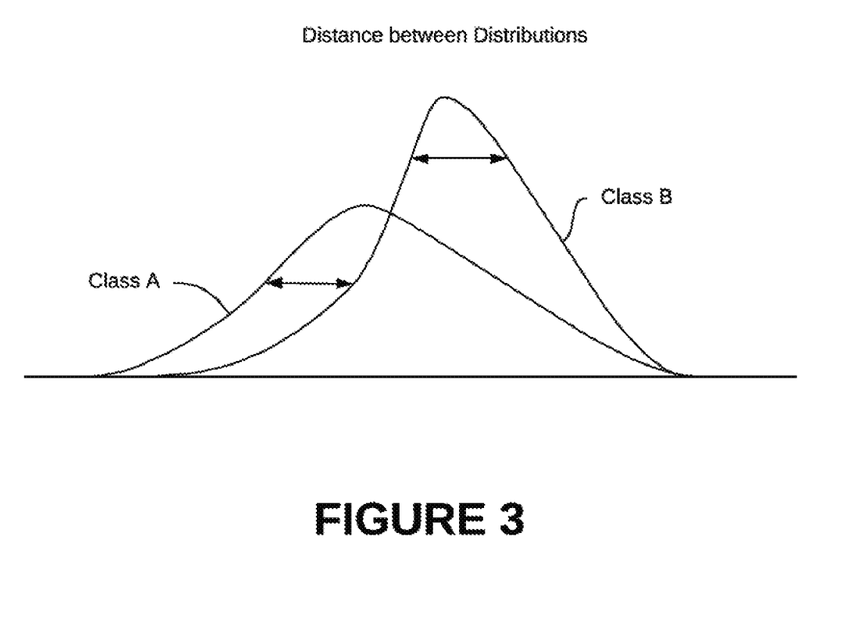
FIG. 3 illustrates an example measurement of disparity between two distinct distributions underlying two classes of data in accordance with one or more embodiments of the present application.

In one implementation, computing the divergence distance between two target distributions may include computing a distance between samples along each side of a superimposition of a first distribution of the control class of control data samples and a second distribution of the test class of test data samples, as shown by way of example in FIG. 3. In a non-limiting example having overlapping distributions, a first side may be defined by the segments of a first and second distributions that lie along a left side of a point of division or intersection and a second side may be defined by the segments of the first and the second distributions that lie along a right side of the point of division, where the point of division relates to a point at which a curvature of the first and the second distributions intersect. In such an example, computing the JS divergence may first include computing the difference between points of the first and second distributions along the left side and the difference between the points of the first and second distributions along the right side. Additionally, or secondly, computing the JS divergence distance may include taking an average of the one-sided JS divergence values calculated for each of the first and second sides.

It shall be recognized that, in some embodiments, if a number of class data samples within the target distributions do not satisfy or exceed a distribution size threshold (e.g., a minimum number of class data samples of a target distribution), the method 200 may function to perform the divergence distance or the model disparity computations directly with the class data samples the target distributions. However, in one or more preferred embodiments, if the number of class data samples within target distributions satisfy or exceed the distribution size threshold, the method 200 may operate to perform a random sampling of the class data samples of the target distributions to reduce a computational complexity of the divergence distance or the model disparity computations.

2.40 Defining an Indiscernibility Constraint Training Parameter | Distribution-Matching Term S240, which includes defining an indiscernibility constraint as a part of a loss function parameter for training a model, may function to define a disparity-informed or disparity-mitigating loss function for mitigating a disparity in a target machine learning model's inferences and/or predictions for at least two target distributions associated with at least two distinct classes or categories of data. In some embodiments, the indiscernibility constraint may be referred to herein as the "distribution-matching term" since the indiscernibility constraint when used in training a machine learning model and, namely during backpropagation, may force two distributions of ML outputs for two distinct classes of data to match or come into alignment. Additionally, or alternatively, the indiscernibility constraint preferably comprises a non-parametric constraint term.

Figure 4:
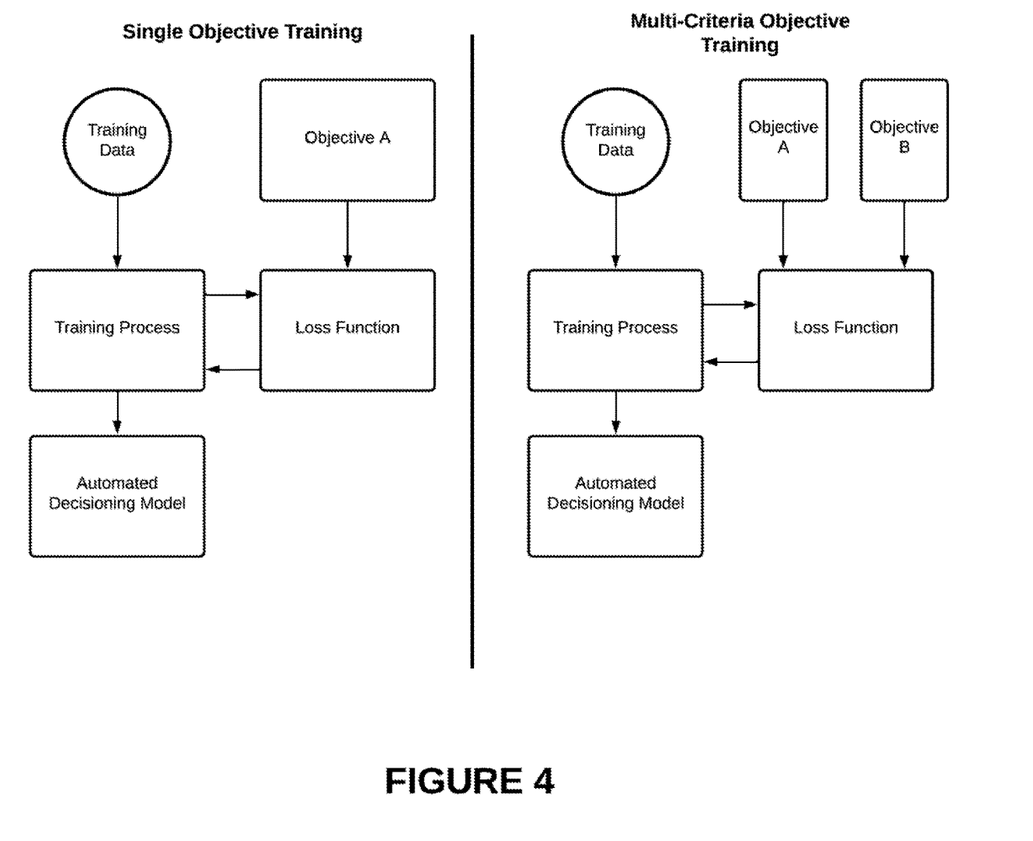
FIG. 4 illustrates a schematic representation of a single objective error function and a disparity-constrained multi-objective error function for training a machine learning model of an automated decisioning system in accordance with one or more embodiments of the present application.

In one or more embodiments, a creation and/or a derivation of the indiscernibility construct may be based on a computed JS divergence distance (as described in S230) for two target distributions. As shown below in the example loss function for a target machine learning model, the indiscernibility constraint term may augment or be added to a primary accuracy error mitigation term. In a traditional loss function, there may be only one criteria, such as accuracy error, that may be optimized during a training of a target machine learning model and specifically, during backpropagation. However, in a preferred embodiment, the augmentation of the indiscernibility constraint parameter to the loss function defines a multi-criteria loss function and, additionally, may function to constrain observable values that optimize the loss function and specifically, values that minimize the accuracy error component of the loss function while simultaneously minimizing the disparity error component of the loss function. Thus, in one or more preferred embodiments, an optimization (i.e., minimization) of the indiscernibility-constrained multi-criterion loss function may function to minimize accuracy error of a target machine learning model and in a concerted fashion encouraging the disparity metric value (i.e., JS divergence distance) of the target machine learning model to zero (0), as shown by way of example in FIG. 4.

$$l(\mathcal{A}, \mathcal{B}, X, Y) = \lambda \underbrace{\sum_i \xi(a_i, b_i)}_{\text{Reduce error}} + \underbrace{(1 - \lambda) JS(X, Y, m)}_{\text{reduce disparity}}$$

In the above example loss function, let $(A, B) = \xi(a_i, b_i) \in \langle R^N, R \rangle$ be a sequence of samples and target values corresponding to the samples, let $\xi$ be any loss function, and let $X, Y \subset A$. Let $\lambda \in [0, 1]$ and let $m > 0$.

In one or more embodiments, it may be possible to construct a loss function for training a machine learning model which includes a plurality of distinct indiscernibility constraint terms. For instance, if the target machine learning model produces predictions for multiple distinct classes of data, such as three or more classes of data, then the method 200 may be implemented to construct or define at least two distinct indiscernibility parameters that reduces disparity between two of the (disparity-affected) classes data relative to one or more control classes of data.

It shall be recognized that the methods and techniques described herein may be implemented to indiscernibly constrain any type or kind and/or any number of loss functions for a target machine learning model. That is, while the above example includes only an error mitigating term, in some embodiments, the loss functions may include a plurality of distinct constraint terms for directing and/or improving one or more performance metrics of a target machine learning model.

Optionally, or additionally, S240 may function to compute or identify whether a calculated disparity value or JS divergence distance is fair. That is, S240 may function to identify whether the predictions of and/or outputs derived from a target or subject machine learning model may be fair or unfair with respect to two or more distinct classes to which the predictions and/or outputs of the target machine learning model may be applied. In one or more embodiments, a disparity may be considered unfair if a calculated JS divergence distance satisfies or exceeds a fairness threshold, i.e., a maximum JS divergence distance. Conversely, a disparity may be considered fair if a calculated JS divergence distance does not exceed a fairness threshold. In some embodiments, the fairness threshold may be set in any suitable manner and/or using any suitable statistical technique or available guideline. In such embodiments, an evaluation of fairness of a model disparity may inform a decision to inject or not to inject an indiscernibility constraint term into a loss function associated with a training of a target machine learning model. In determining whether to construct and include the indiscernibility term, S240 may function to evaluate a calculated disparity value against a fairness threshold, and if satisfied, may function to automatically construct one or more indiscernibility constraint terms (as described herein) and augment the one or more indiscernibility terms to a target loss function for steering a training of a machine learning model towards a reduction in the disparity metric value.

Figure 5:
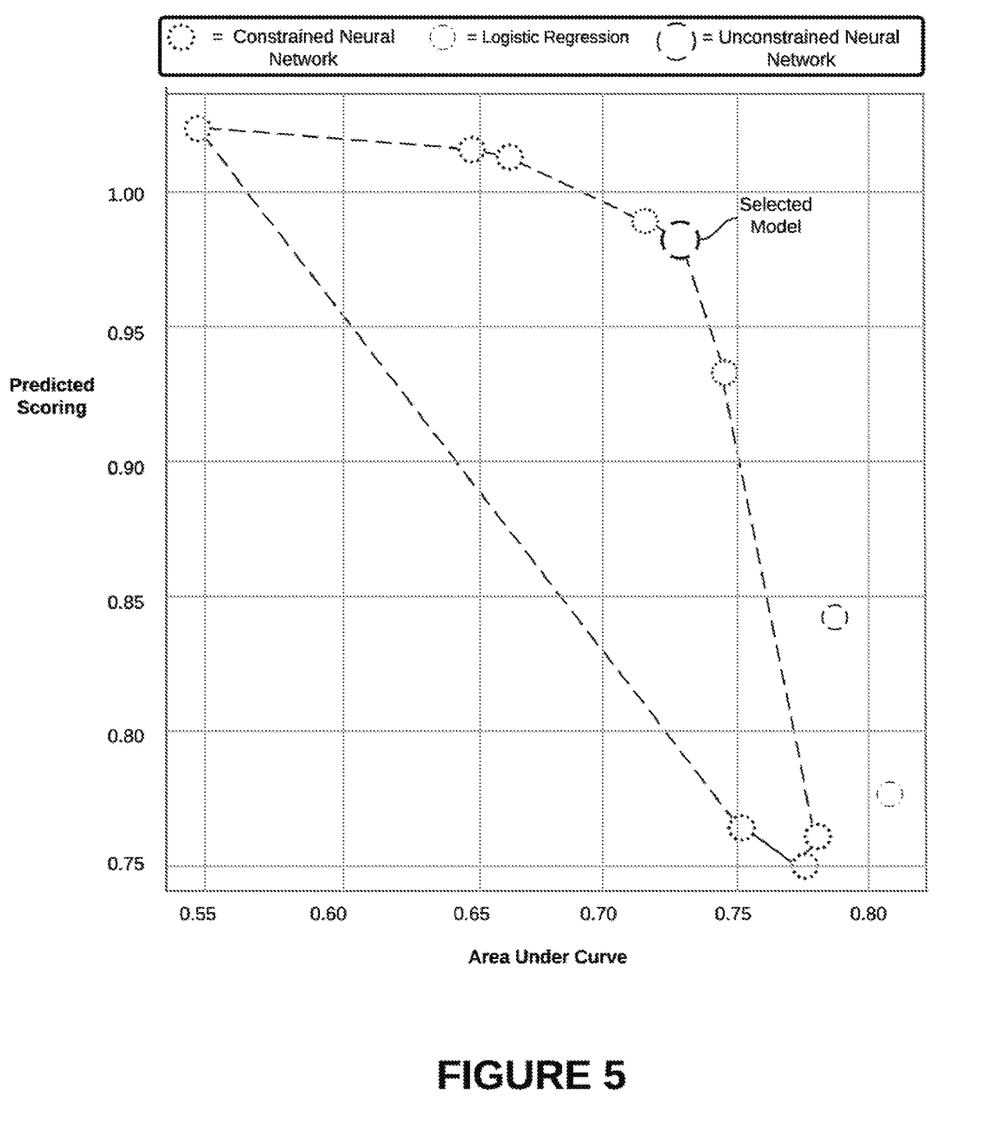
FIG. 5 illustrates a Pareto efficiency frontier for a multi-criteria, disparity-constrained error function for selecting optimized parameters for a target machine learning model in accordance with one or more embodiments of the present application.
Figure 6:
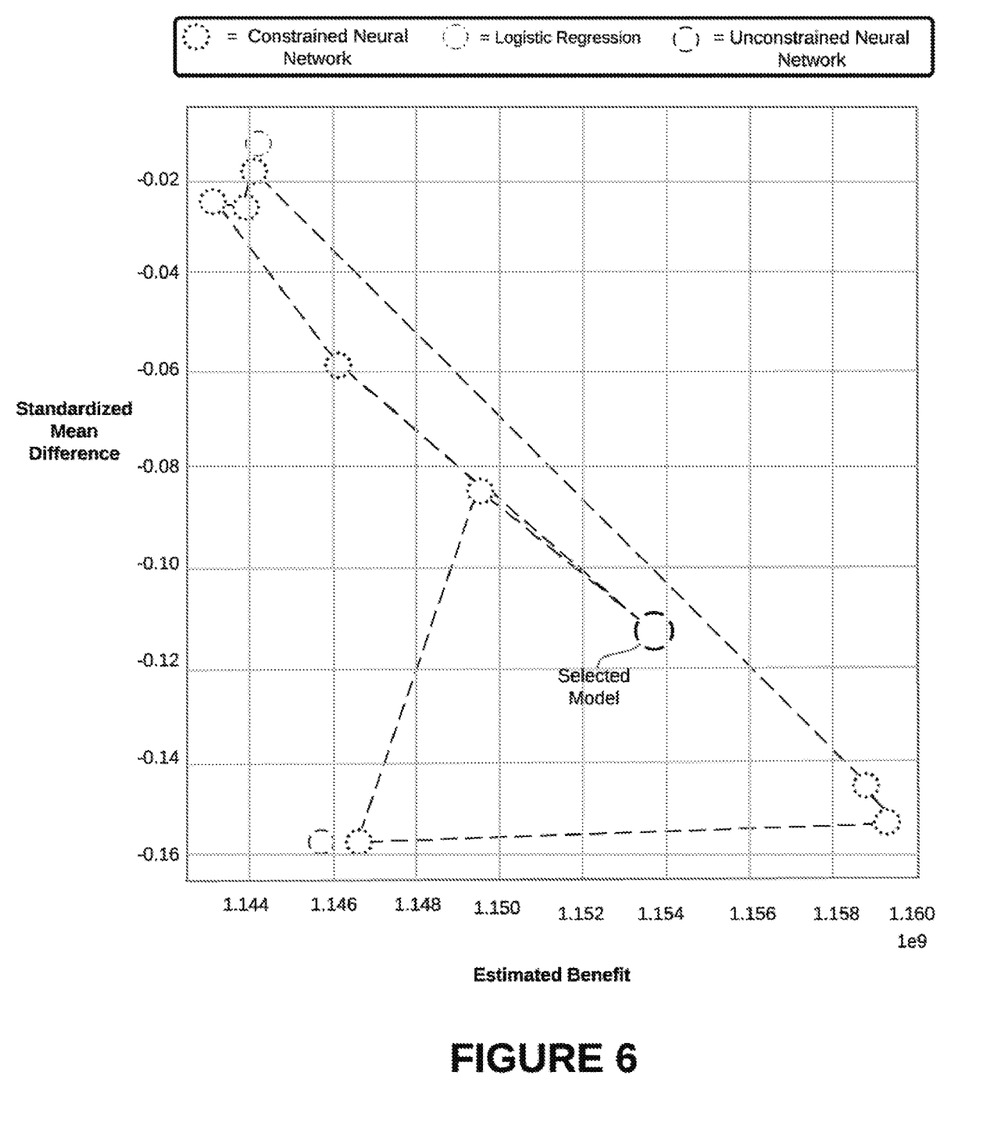
FIG. 6 illustrates a graphical representation of a performance of an unconstrained machine learning model in accordance with one or more embodiments of the present application.

In one or more embodiments, the method 200 may, additionally, or alternatively, include optimizing the disparity-constrained loss function for a target machine learning model. Since the disparity-constrained loss function comprises a multi-criteria objective function with potentially competing loss function components, the method 200 may function to generate and/or identify a set of Pareto optimal solutions that dually optimizes each loss function component of the disparity-constrained loss function. As shown by way of example in FIG. 5, a disparity-constrained machine learning model with optimized loss function terms may be selected along the Pareto optimal frontier. In one or more embodiments, target machine learning model options selected or available along the Pareto optimal frontier may function to dually optimize loss function terms, including an indiscernibility constraint term, with some tradeoffs between the loss function terms. By contrast, as shown in FIG. 6, a performance of an unconstrained machine learning model is illustrated that underperforms relative to several available constrained models along the Pareto efficiency frontier, in terms of a target performance metric represented by the area under the curve.

Accordingly, in one or more embodiments, in which a Pareto efficiency frontier may be generated or identified, the method 200 may function to select constraint parameters for a machine learning model along the frontier for a training or re-training thereof, as described below.

2.50 Model Adjustments | Re-Training a Target Model | Forcing Homogeneity of Distinct Class Distributions | Distribution Reconciliation S250, which includes implementing a disparity mitigation constraint during model training, may function to incorporate an indiscernibility constraint term into a re-training or a training of a target machine learning model. In a preferred embodiment, S250 may function to transform the target machine learning model from an unconstrained artificial neural network to a disparity-constrained artificial neural network.

In one implementation, S250 may function to selectively constrain one or more target layers of a target machine learning model. In such implementation, an indiscernibility constraint may be integrated or augmented into an unconstrained loss function thereby transforming the loss function into a disparity-constrained loss function. As such, during a training and specifically, during an execution of a backpropagation operation or gradient descent algorithm, S250 may function to compute weights for learnable parameters of the target machine learning algorithm that simultaneously optimizes (i.e., minimizes) each loss function component of the constrained loss function including, but not limited to, minimizing the indiscernibility constraint component.

It shall be recognized that, in one or more embodiments, to increase an efficiency (or speed) of re-training a target machine learning model with a disparity-constrained loss function, S250 may function to selectively apply the indiscernibility constraint term to loss functions associated with selected or target layers of the target machine learning model comprising an artificial neural network. That is, in one or more embodiments, a target machine learning model may include a plurality of distinct neural network layers and, in such embodiments, S250 may function to selectively apply the indiscernibility constraint term of a discernibility constrained loss function to one or more disparity-causing neural network layers of the target machine learning model. In this way, a complexity of and technical computational efficiency (e.g., speed) of backpropagation during a neural network training may be improved.

Additionally, or alternatively, a training or re-training of the target machine learning model with a disparity-constrained loss function may be performed using any suitable training data corpus, such as a geographic region-specific training corpus, subscriber agnostic or region agnostic training corpus, and/or the like. In general, a result of a training or re-training of the target machine learning model with a disparity-constrained loss function preferably results in a disparity mitigation-optimized machine learning model with increased overall performance metrics in at least predictive accuracy and disparity reduction.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for mitigating disparities of inferential outputs of a machine learning model, the method comprising:
generating an indiscernibility constraint based on a distribution divergence metric value computed between a distribution associated with a non-disparity affected class of data samples and a distribution associated with a disparity affected class of data samples, wherein the indiscernibility constraint mitigates a machine learning-based inferential disparity between the non-disparity affected class of data samples and the disparity affected class of data samples during a training of a target machine learning model;
configuring a disparity-mitigating loss function based on augmenting a gradient descent algorithm with the indiscernibility constraint; and
training the target machine learning model using a training corpus of labeled data samples, wherein the training includes performing backpropagation using the disparity-mitigating loss function.

2. The method according to claim 1, wherein the disparity-mitigating loss function is defined as follows:

$$l(\mathcal{A}, \mathcal{B}, X, Y) = \lambda \underbrace{\sum_i \xi(a_i, b_i)}_{\text{Reduce error}} + \underbrace{(1 - \lambda) JS(X, Y, m)}_{\text{reduce disparity}}$$

where $(A, B) = | (a_i, b_i) \in \langle R^N, R \rangle$ comprises a sequence of data samples and target values corresponding to the sequence of data samples, where $l$ relates to a target loss function, where $X, Y \subset A$ indicates that a first set of data samples $X$ and a second set of data samples $Y$ are subsets of a corpus of data samples $A$, where $l \in [0, 1]$, where $m > 0$.

3. The method according to claim 2, wherein:
the target loss function guides the gradient descent algorithm;
the first set of data samples comprises the non-disparity affected class of data samples; and
the second set of data samples comprises the disparity affected class of data samples.

4. The method according to claim 1, wherein the indiscernibility constraint, when applied in the training of the target machine learning model, reduces a Jensen-Shannon divergence between a distribution of a first set of machine learning inferences based on a first class of data and a distribution of a second set of machine learning inferences based on a second class of data.

5. The method according to claim 1, wherein the indiscernibility constraint, when applied in the training of the target machine learning model, causes a distribution of a first set of machine learning inferences based on a first class of data to match a distribution of a second set of machine learning inferences based on a second class of data.

6. The method according to claim 1, wherein the indiscernibility constraint, when applied in the training of the target machine learning model, causes a distribution of a first set of machine learning inferences based on a first class of data to align with a distribution of a second set of machine learning inferences based on a second class of data.

7. The method according to claim 1, wherein the backpropagation of the training of the target machine learning model, when applying the disparity-mitigating loss function, computes coefficients for learnable variables of the target machine learning model that simultaneously minimizes an accuracy error of the target machine learning model while minimizing a disparity distance between distinct distributions of inferential outputs of the target machine learning model.

8. The method according to claim 1, wherein generating the indiscernibility constraint includes computing a first partial Jensen-Shannon (JS) divergence based on an approximate distribution of the non-disparity affected class of data samples with reference to an approximate distribution of the disparity affected class of data samples.

9. The method according to claim 8, wherein generating the indiscernibility constraint includes computing a second partial JS divergence based on the approximate distribution of the disparity affected class of data samples with reference to the approximate distribution of the non-disparity affected class of data samples.

10. The method according to claim 9, wherein
generating the indiscernibility constraint includes computing a JS divergence distance based on the first partial JS divergence and the second partial JS divergence, and
the JS divergence distance relates to a distance between the approximate distribution of the non-disparity affected class of data samples and the approximate distribution of the disparity affected class of data samples that indicates a likely disparity between machine learning inferences associated with member samples of the disparity affected class and the non-disparity affected class.

11. The method according to claim 1, further comprising:
computing a JS divergence distance based on machine learning inferences of the target machine learning model, as trained, for each of a first class of data samples and a second class of data samples; and
terminating a continuation of the training of the target machine learning model when the JS divergence distance satisfies a non-disparity threshold comprising a maximum JS divergence distance value.

12. The method according to claim 1, further comprising:
computing a distinct indiscernibility constraint for each of a plurality of distinct pairings of a given non-disparity affected class of data samples and a given disparity-affected class of data samples.

13. The method according to claim 1, further comprising:
sourcing a corpus of data samples comprising at least (a) a non-disparity affected sub-corpus of the non-disparity affected class of data samples and (b) a disparity-affected sub-corpus of the disparity affected class of data samples, wherein sourcing the corpus of data samples includes sourcing data samples from within a defined geographical region, wherein the corpus of data samples comprises a geographic region-specific corpus of data samples, and
generating the indiscernibility constraint is based on the geographic region-specific corpus of data samples.

14. A method of encouraging inferential fairness of an artificial neural network, the method comprising:
computing a disparity divergence based on an approximate distribution of a non-disparity affected class of data samples and an approximate distribution of a disparity affected class of data samples;
generating a distribution-matching term based on the disparity divergence, wherein the distribution-matching term mitigates an inferential disparity between artificial neural network inferences for the non-disparity affected class of data samples and the disparity affected class of data samples during a training of an artificial neural network;
constructing a disparity-constrained loss function based on integrating the distribution-matching term with a loss function; and
training the artificial neural network using a training corpus of labeled data samples, wherein the training includes performing backpropagation using the disparity-constrained loss function.

15. The method according to claim 14, wherein
the distribution-matching term encourages a distribution of a first set of artificial neural network inferences based on a first class of data toward a distribution of a second set of artificial neural network inferences based on a second class of data.

16. A method comprising:
computing a disparity divergence based on an estimated distribution of a disparity affected class of data samples and an estimated distribution of a control class of data samples;
generating a distribution-matching term based on the disparity divergence, wherein the distribution-matching term mitigates an inferential disparity between the control class of data samples and the disparity affected class of data samples during a training of an unconstrained artificial neural network;
constructing a disparity-constrained loss function based on including the distribution-matching term with a target loss function; and
transforming the unconstrained artificial neural network to a disparity-constrained artificial neural network based on a training of the unconstrained artificial neural network using the disparity-constrained loss function.

17. The method according to claim 16, wherein
the distribution-matching term, when applied in the training of the unconstrained artificial neural network, causes a distribution of a first set of artificial neural network inferences based on a first class of data to align with a distribution of a second set of artificial neural network inferences based on a second class of data.

18. The method according to claim 16, wherein
training the unconstrained artificial neural network further includes performing backpropagation using the disparity-constrained loss function, wherein the backpropagation, when applying the disparity-constrained loss function, computes coefficients for learnable variables of the disparity-constrained artificial neural network that simultaneously minimizes an accuracy error of the disparity-constrained artificial neural network while minimizing a disparity distance between distinct distributions of inferential outputs of the disparity-constrained artificial neural network.

* * * * *